April 28, 1959 R. A. GURRIES ET AL 2,883,777
LATERAL LEVEL CONTROL MECHANISM FOR ROAD GRADERS
Filed Sept. 20, 1957 4 Sheets-Sheet 1

INVENTORS
R. A. Gurries
John Curlett
BY
ATTYS

April 28, 1959 R. A. GURRIES ET AL 2,883,777
LATERAL LEVEL CONTROL MECHANISM FOR ROAD GRADERS
Filed Sept. 20, 1957

INVENTORS
R. A. Gurries
BY John Curlett

ATTYS

April 28, 1959 R. A. GURRIES ET AL 2,883,777
LATERAL LEVEL CONTROL MECHANISM FOR ROAD GRADERS
Filed Sept. 20, 1957 4 Sheets-Sheet 4

INVENTORS
R. A. Gurries
John Curlett
BY
ATTYS

United States Patent Office 2,883,777
Patented Apr. 28, 1959

2,883,777
LATERAL LEVEL CONTROL MECHANISM
FOR ROAD GRADERS

Raymond A. Gurries, San Jose, and John Curlett, Los Gatos, Calif., assignors to Gurries Manufacturing Co., San Jose, Calif., a corporation of California Application September 20, 1957, Serial No. 685,106

8 Claims. (Cl. 37—180)

This invention relates to surface leveling machines, and particularly to a road grader of a type which comprises a main rigid frame to which a scraping blade is rigidly connected, and transversely spaced wheels supporting the frame adjacent the blade and arranged for vertical movement relative thereto.

The principal object of the present invention is to provide a pendulum-operated mechanism which controls the relative raising or lowering of one wheel according to the deviation of the road surface from a predetermined transverse level relative to a true horizontal plane.

Another object of the invention is to provide a hand-control means, incorporated with the pendulum-actuated mechanism, by means of which the mechanism may be set to function to control the raising or lowering of said wheel from a transverse setting of the machine other than horizontal, as when the road bed has been—or is to be—graded with a certain desired transverse slope relative to a true horizontal plane. In other words, said transverse slope is then normal, and the level control mechanism will then function to maintain the grading action on said slope.

The grader also includes means to adjust both wheels simultaneously according to deviations in the roadbed in a longitudinal direction, and a further object of this invention is to provide a hydraulic system arranged so that either said one wheel or both wheels simultaneously may be adjusted at the option of the operator.

It is also an object of the invention to provide a practical, reliable, and durable lateral level control mechanism for road graders, and one which will be exceedingly effective for the purpose for which it is designed.

These objects are accomplished by means of such structure and relative arrangement of parts as will fully appear by a perusal of the following specification and claims.

In the drawings:

Fig. 7 is a diagram of the hydraulic system of the grader control mechanism.

Figure 1:
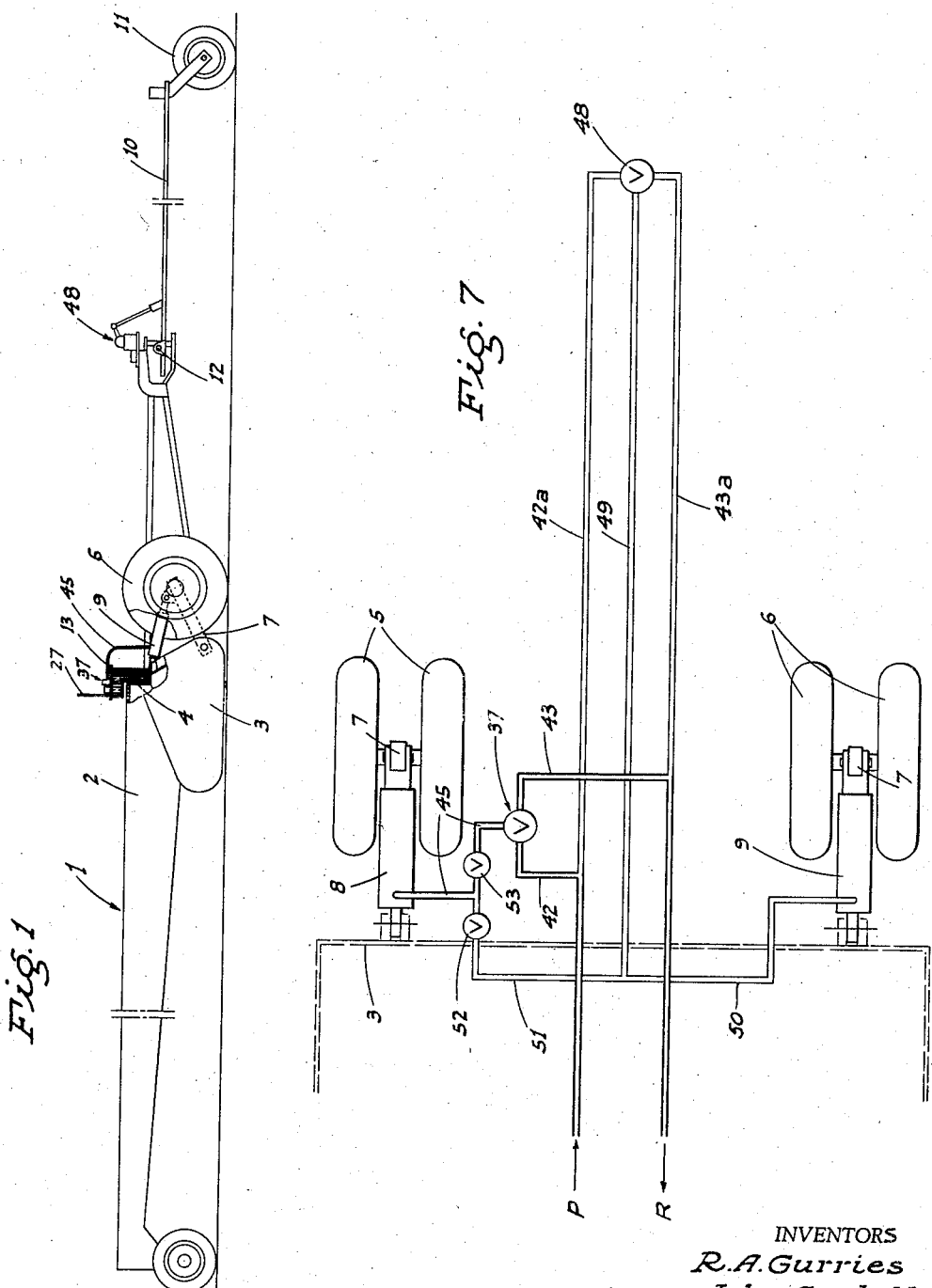
Fig. 1 is a somewhat diagrammatic and foreshortened elevation of a road grader equipped with the improved lateral-level control mechanism.

Referring now more particularly to the drawings, and to the characters of reference marked thereon, the grader 1 to which the improved control mechanism is applied is preferably of the type shown in Patent No. 2,792,651, granted May 21, 1957, to H. W. Hobday. The grader thus comprises a main rigid frame structure 2 to which a bowl and blade unit 3 is rigidly connected; the frame structure including a cross beam 4 above the bowl.

Transversely spaced dual wheel units 5 and 6 are disposed adjacent and rearwardly of the bowl, each wheel unit being connected to the bowl by a swivel arm 7. Hydraulic rams 8 and 9 are connected to the arms 7 of the wheel units 5 and 6, respectively, and to the back of the bowl, in such angular relation to the arms that extension of the rams will cause a relative lowering of the wheels and a corresponding lifting of the bowl.

The grader as here shown also includes a tail frame 10 supported at its rear end by a wheel 11, and connected at its forward end to the rear end of the main frame structure 2 by means which includes a transverse pivot member 12 so that the tail frame may swivel vertically relative to the main frame.

In order to control the extension or contraction of one of the rams—as for instance the ram 8—upon deviation of the bowl from a predetermined lateral level, the control mechanism now to be described is employed.

Such mechanism comprises a rigid housing 13 arranged to be rigidly mounted on the grader adjacent the bowl, as for instance on the cross beam 4, as shown in Fig. 1, and at any suitable point in the length thereof.

A shaft 14, which extends lengthwise of the grader, is turnably mounted adjacent the top of the housing in spaced bearing blocks 15. A pendulum 16 is fixed on and depends from shaft 14 between the bearing blocks, and a relatively short arm 17, also secured on the shaft at one end thereof, extends therefrom in a horizontal direction and laterally of the grader. A transversely extending plate 18 is pivoted at one end on the outer end of the arm 17, as at 18a, and extends thence across the axial plane of the shaft 14 to a termination some distance therebeyond.

Figure 3:
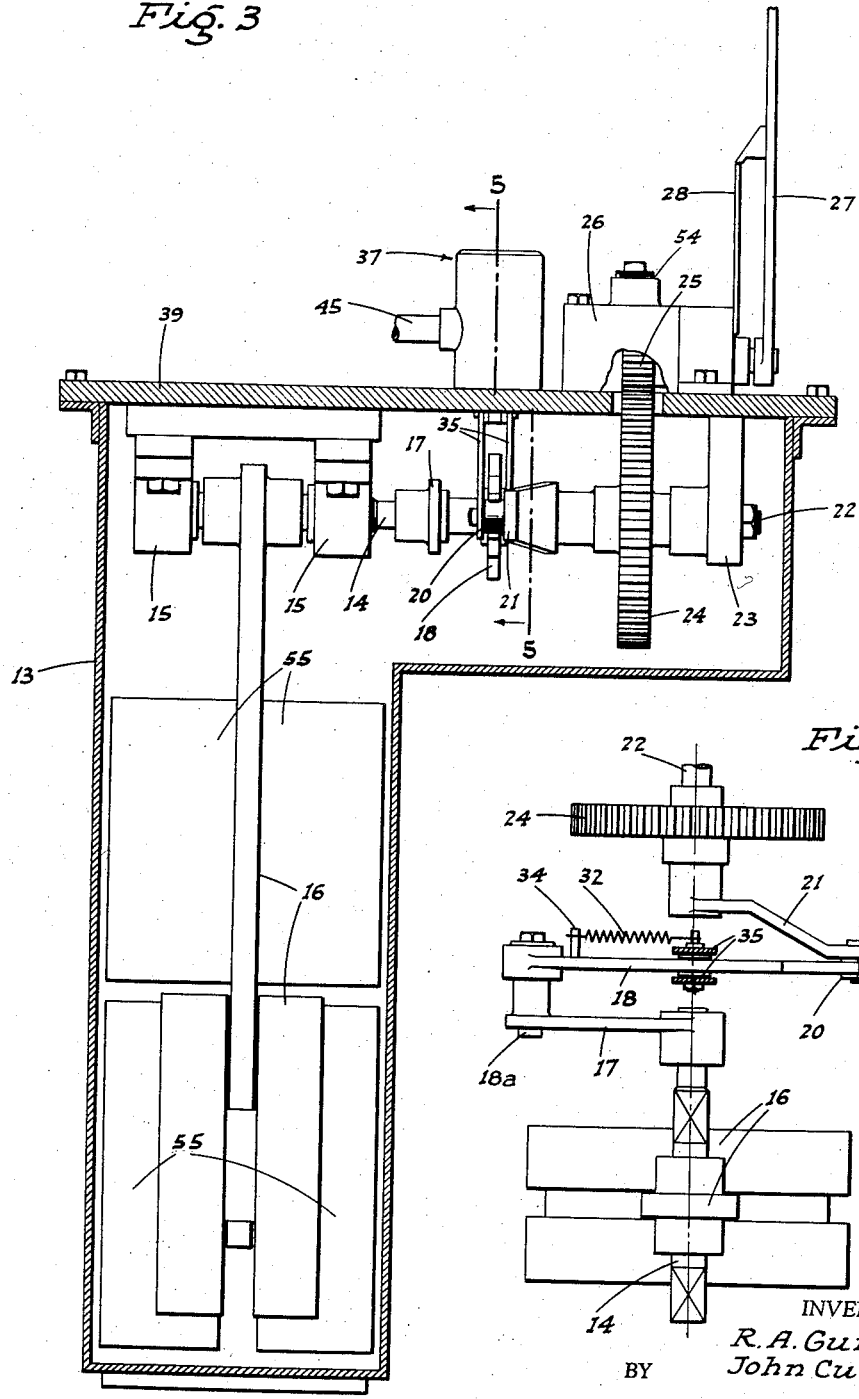
Fig. 3 is a sectional elevation on line 3—3 of Fig. 2.
Figure 4:
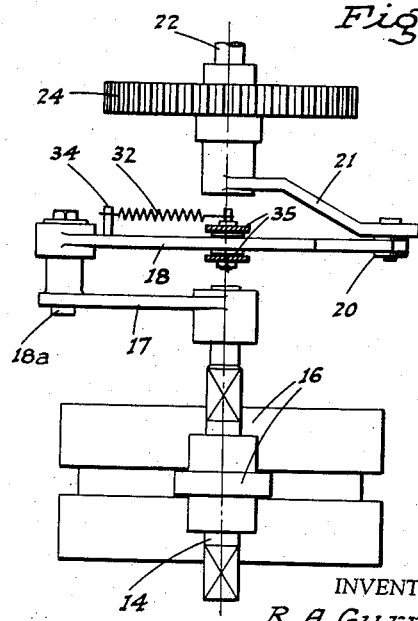
Fig. 4 is a fragmentary sectional plan, substantially on line 4—4 of Fig. 2, and with the bearing blocks of the pendulum shaft removed.

At its end opposite its pivoted end the plate 18 is provided with a horizontal or longitudinally extending slot 19 in which a roller 20 rides. This roller is mounted on the outer end of a laterally extending arm 21 which, at its opposite or inner end, is mounted on a shaft 22 supported by a housing-mounted bracket 23 (see Fig. 3). The arm 21 is fixed with a gear 24 mounted on shaft 22; the gear meshing with a pinion 25 mounted in a top extension 26 of the housing 13 and connected to a hand lever 27 adapted to be adjustably held in a fixed position and reading on a graduated quadrant 28.

Figure 2:
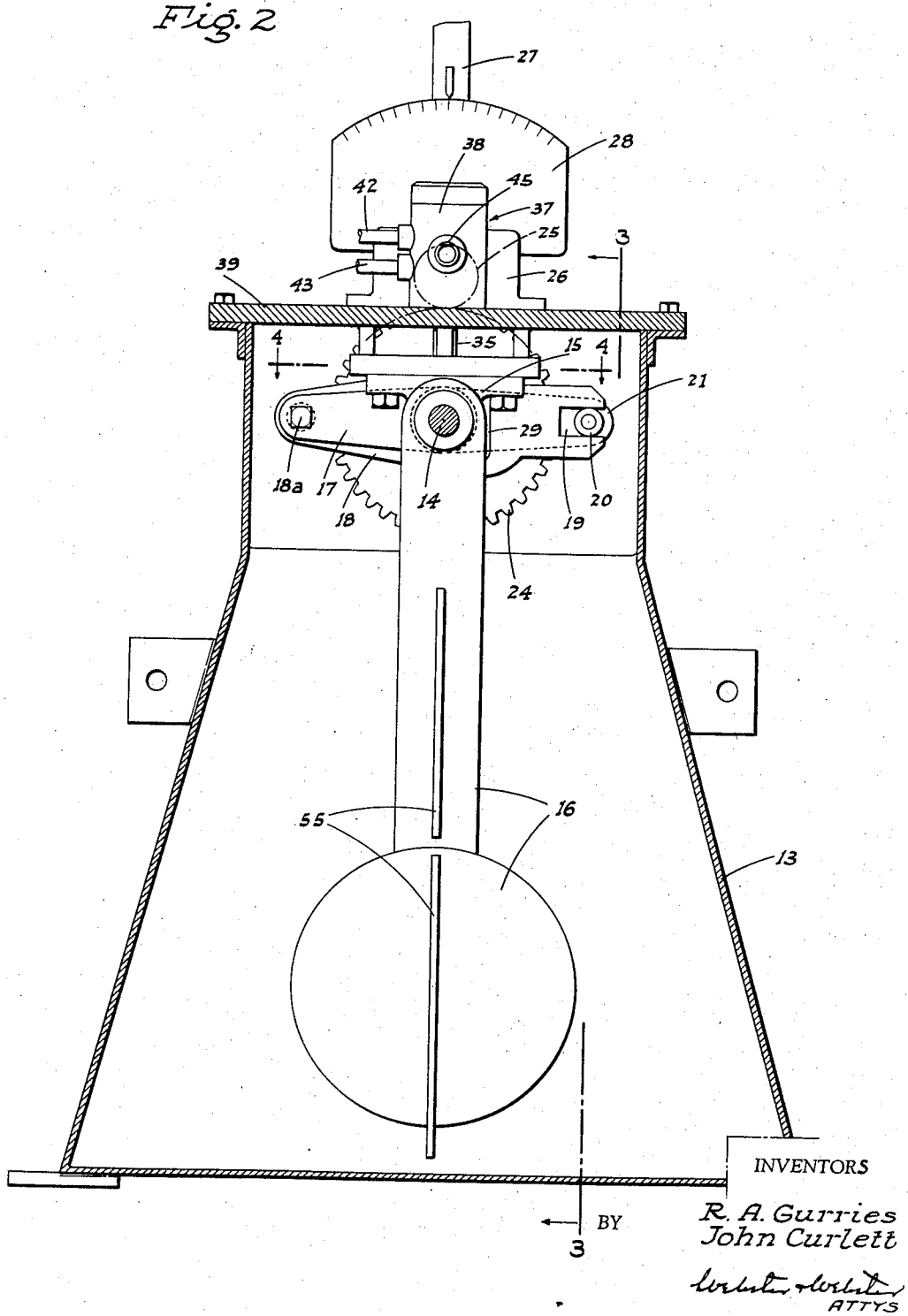
Fig. 2 is an elevation of the actuator of such mechanism, with the housing thereof in section and detached from the grader.
Figure 5:
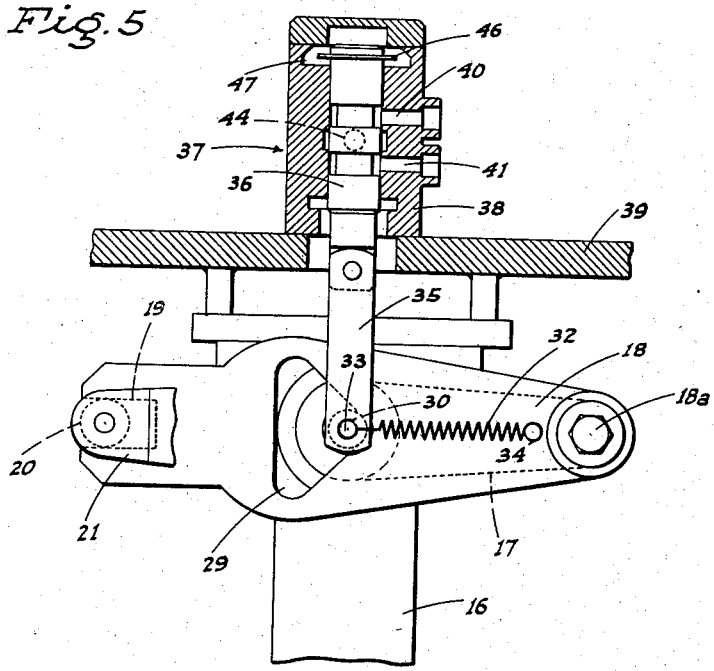
Fig. 5 is a fragmentary enlarged transverse section taken on line 5—5 of Fig. 3 and showing the pendulum in a normal dependent position.

The plate 18, intermediate its ends, is provided with a slot 29 of generally triangular configuration. This slot is circular at its apex, as at 30; the center of the circular portion being coaxial with shaft 14 when the plate 18 is in a normal straight-across position, as shown in Figs. 2 and 5. The slot is cut in the plate so that the opposite sides slope away from the pivoted end 18a, and each is set at an angle of substantially 45 degrees to the median line of the plate.

A roller 31, the same radius as that of the slot apex 30, rides in the slot in normal engagement with said circular apex 30, and is yieldably held therein by a tension spring 32 connected to the roller spindle 33 and to a pin 34 projecting from the plate near the pivoted end 18a of the plate.

The roller spindle 33 is supported by upstanding links 35 which straddle the roller and plate 18, and are pivoted at their upper ends to the piston or plunger 36 of a piston-type valve 37, and which includes a cage 38 mounted on and upstanding from the top plate 39 of the housing 13.

The cage 38 is provided with vertically spaced pressure and relief passages or ports 40 and 41, respectively, which are connected to coresponding pressure and relief conduits 42 and 43 of a hydraulic system of conventional type. Another port 44 is provided in the cage 38 in a plane between ports 40 and 41, and is connected to a conduit 45 leading to and from the head end of ram 8. It should be here noted that said ram is of the one-way type, being extended by fluid pressure but contracted by gravity pressure when the fluid is relieved.

The plunger 36 is arranged to alternately establish communication between ports 40 and 44 or between ports 41 and 44 upon downward and upward movement, respectively, of the plunger; said plunger being in a neutral or port-closing position when the pendulum is in a truly vertical position.

The plunger, adjacent its upper end, is provided with an enlarged collar 46 which projects into an annular recess 47 in the cage 38. This recess is of sufficient axial extent to allow of the desired opening movement of the plunger, either up or down from a closed position, before the collar will engage the upper or lower wall of the recess and thus prevent further axial movement of the plunger.

In operation, referring particularly to Figs. 2 and 5, the pendulum 16 of course always remains perpendicular, so that the pendulum-controlled arm 17 is maintained in a horizontal plane. If the grader is operating on a true horizontal level laterally, the plate 18 will also be held in a true horizontal plane laterally. This is because the roller 20 which engages the outer end of the plate is stationary with the housing 13, which in turn is stationary with the grader bowl. With this relative positioning of the parts the valve 37 remains closed, as shown in Fig. 5.

When the road surface deviates from a true horizontal level laterally the bowl is correspondingly tilted, resulting in a relative swing of the pendulum to one side or the other. This results in a relative upward or downward movement of arm 17 and a corresponding swinging of plate 18 about pin 20 as a fulcrum. With such relative movement of the plate 18 the apical end of slot 29 raises or lowers, and the roller 31—being normally retained in the circular apex of the slot 29, the valve plunger 36 is pushed or pulled accordingly. This will open the valve in one direction or the other, to either feed fluid to the ram 8 or relieve such fluid therefrom, so as to relatively raise or lower the corresponding wheel unit 5, and which actually of course raises or lowers the grader bowl and blade on that side. As soon as the normal level of the blade is restored, the accompanying relative movement of the valve and associated parts again closes the valve.

Figure 6:
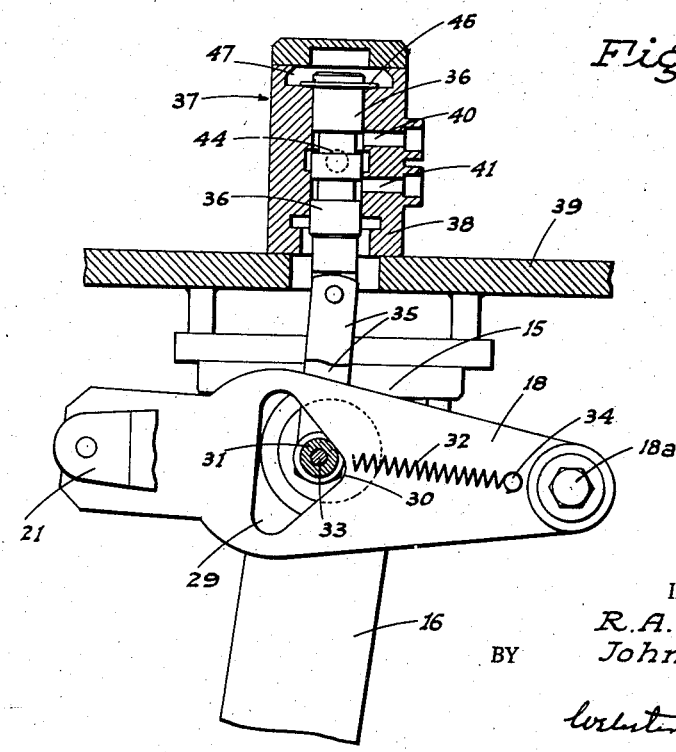
Fig. 6 is a similar view, but showing the pendulum as swung to one side.

As previously described, the collar 46 limits the opening movement of the valve plunger. However, should the swinging movement of the pendulum be greater than needed to move the plunger to its allowed limit, the roller 31 will merely climb one sloping side or the other of the slot 29, as shown in Fig. 6, and no excessive strain is placed on the links or plunger. The spring 32 holds the roller against the wall of the slot, and causes said roller to re-enter the curved apex 30 of the slot when the plate 18 reassumes its normal position.

Should it be desired that the grader operate on a roadbed having a predetermined lateral slope relative to a horizontal plane, the lever 27 is swung so that the gear 24 is turned. This will swing the arm 21 which is rigid with said gear, so that the roller 20 on said arm is actually raised or lowered in the housing. This will swing the plate 18 about pivot 18a as a fulcrum, causing the valve 37 to be opened in one direction or the other, depending on the direction which the lever is swung. The hydraulic fluid will thus be admitted to, or relieved from, the ram 8 and the grader will thereafter assume a normal position at such predetermined lateral slope, and any changes in the roadbed from such desired slope, which will change the slope of the grader, will automatically set up a compensating movement of the grader, as described in connection with the operation of the grader on a horizontally level surface.

The grader shown in Fig. 1 is provided with a means to control the actuation of both rams 8 and 9 simultaneously upon deviation of the roadbed from a true constant level in a longitudinal direction. This means includes a valve unit 48 mounted on the rear end of the main frame and actuated upon relative vertical swivel movement of the main and tail frames. This valve unit, and the actuating means therefor, may be as shown in the aforementioned patent, No. 2,792,651, or in our copending application, Serial No. 684,481, filed September 17, 1957.

The hydraulic system previously described for ram 8 is also utilized in connection with the actuation of both rams simultaneously by the functioning of the valve unit 48.

To this end, extensions 42a and 43a of the pressure and relief conduits 42 and 43, respectively, connect said conduits ahead of valve 37 with valve 48, while a single outlet conduit 49 from valve 48 is branched to provide a conduit 50 leading to ram 9 and another conduit 51 leading to a connection with conduit 45 intermediate its ends, as shown in Fig. 7.

A hand valve 52 is interposed in conduit 51 to prevent a flow of fluid to ram 9 when valve 37 is being actuated, and a hand valve 53 is interposed in conduit 45 ahead of its connection with conduit 51 to prevent actuation of ram 8 by the pendulum control should this not be desired.

The housing 13 is maintained substantially full of oil fed through a plugged intake 54 in the top of the housing extension 26. To dampen the free swinging of the pendulum, vanes 55 are mounted thereon in crossing relation to its direction of swing.

It may be noted that this implement is to be made for use with or without the pendulum control. When the pendulum is not to be used, the two wheel arm units are connected by a single torsion shaft, as is ordinarily the case and as shown in said Patent No. 2,792,651, and pendulum control is cut off by closing valve 53. The valve 52 is then opened so that the rear actuator 48 will control both rams. The implement then follows the lateral slope of the road and cannot alter it.

When pendulum control is desired with an implement as thus constructed, the valve 52 is closed, valve 53 is opened, and the tension shaft is disconnected so that the wheels can move out of phase. The ram 9 then functions to hold straight-line cutting in the direction of travel, and ram 8 functions to follow this line as well as to compensate for transverse irregularities in the road bed.

It should be noted that with the valve 52 closed and the valve 53 open, as above stated, the pendulum valve 37 is connected only to the ram 8, while the longitudinal control valve 48 is connected only to ram 9. However, since valve 37 holds the transverse slope to a predetermined setting, it will also operate to hold this slope when the action of valve 48 and ram 9 operate to vary the height of the corresponding side of the machine in order to compensate for a relative longitudinal change of level or contour of the roadbed. Thus, while ram 8 does not itself directly control the longitudinal or straight line cutting of the roadbed, it duplicates or compensates for the motion of ram 9, in order that the cross slope shall not be changed when said ram 9 operates to directly govern the longitudinal cut. Therefore, when the roadbed is out of true in both directions, both rams function together to hold their respective settings; the action of one ram compensating for the action of the other ram.

From the foregoing description it will be readily seen that there has been produced such a device as will substantially fulfill the objects of the invention, as set forth herein.

While this specification sets forth in detail the present and preferred construction of the device, still in practice, such deviations therefrom may be resorted to as do not form a departure from the spirit of the invention, as defined by the appended claims.

Having thus described the invention the following is claimed as new and useful, and upon which Letters Patent are desired:

1. In a road grader which includes a frame, a transverse scraper blade rigid with the frame, transversely spaced wheel units supporting the grader adjacent the blade, means mounting one wheel unit for relative vertical movement, a hydraulic ram connected between the frame and said one wheel unit to thus relatively move the latter, pendulum controlled means mounted on the frame to actuate the ram upon deviation of the road surface traversed by the grader from a predetermined lateral level relative to a horizontal plane, and hand means included in part with said control means to actuate the ram independently of the actuation thereof by pendulum action.

2. In a ground leveling implement which includes a main frame, a tail frame transversely pivoted at its forward end on the rear end of the main frame and having a ground engaging element at its rear end, a transverse scraper blade rigid with the main frame, transversely spaced wheel units disposed adjacent the blade, means mounting the wheel units in connection with the frame for relative vertical movement, and hydraulic rams connected between the frame and wheel units to thus relatively move the latter; pendulum controlled means mounted on the main frame and operable to place one ram in operation upon deviation of the ground surface from a predetermined lateral level relative to a horizontal plane, means to enable both rams to be placed in operation simultaneously upon relative vertical swivel movement of the main and tail frames, and selectively operable means to prevent such operation of both rams simultaneously without affecting the operation of said one ram by said control means.

3. A lateral level control mechanism for a land leveling implement, the implement including a frame, a transverse scraper blade rigid with the frame, transversely spaced wheel units supporting the implement adjacent the blade, means mounting one wheel unit for relative vertical adjustment, a hydraulic ram to control the relative raising and lowering of said unit, and a fluid pressure system connected to the ram; said control mechanism comprising a housing mounted rigid with the frame, a pendulum in the housing, a pivot shaft for the pendulum mounted in the housing and extending lengthwise of the implement, a normally closed valve interposed in the hydraulic system and mounted on the housing, connections between the pendulum and the valve to open the latter upon relative swinging of the pendulum to one side or the other from the perpendicular, and manual means included in part with said connections to open the valve without affecting the pendulum.

4. A lateral level control mechanism for a land leveling implement, the implement including a frame, a transverse scraper blade rigid with the frame, transversely spaced wheel units supporting the implement adjacent the blade, means mounting one wheel unit for relative vertical adjustment, a hydraulic ram to control the relative raising and lowering of said unit, and a fluid pressure system connected to the ram; said control mechanism comprising a housing mounted rigid with the frame, a pendulum in the housing, a pivot shaft for the pendulum mounted in the housing and extending lengthwise of the implement, a normally closed valve interposed in the hydraulic system and mounted on the housing, and connections between the pendulum and the valve to open the latter upon relative swinging of the pendulum to one side or the other from the perpendicular; said connections including an arm extending radially from said pivot shaft and rigid with the pendulum, a plate pivoted at one end on the outer end of the arm and extending thence alongside the arm and across the axial plane of the shaft clear of the same to an inner end termination beyond the shaft, a normally fixed pivot for the inner end of the plate, and a valve actuating link disposed substantially at right angles to the median plane of the plate and operatively connected thereto intermediate the ends thereof.

5. A mechanism, as in claim 4, with hand means to shift said fixed pivot along a path concentric with the shaft.

6. A lateral level control mechanism for a land leveling implement, the implement including a frame, a transverse scraper blade rigid with the frame, transversely spaced wheel units supporting the implement adjacent the blade, means mounting one wheel unit for relative vertical adjustment, a hydraulic ram to control the relative raising and lowering of said unit, and a fluid pressure system connected to the ram; said control mechanism comprising a housing mounted rigid with the frame, a pendulum in the housing, a pivot shaft for the pendulum mounted in the housing and extending lengthwise of the implement, a normally closed valve interposed in the hydraulic system and mounted on the housing, and connections between the pendulum and the valve to open the latter upon relative swinging of the pendulum to one side or the other from the perpendicular; said connections including an arm extending radially from said pivot shaft and rigid with the pendulum, a plate pivot at one end on the outer end of the arm and extending thence alongside the arm and across the axial plane of the shaft clear of the same to an inner end termination beyond the shaft, a normally fixed pivot for the inner end of the plate, a valve actuated link disposed substantially at right angles to the median plane of the plate and extending thereto, means limiting the longitudinal valve opening movement of the link from a closed position of the valve, and means yieldably and operatively connecting the link to the plate to move the link lengthwise upon swinging of the plate and so that the latter may swing about either pivot in opposite directions from a neutral position a greater distance than is necessary to move the link to its limit.

7. A lateral level control mechanism for a land leveling implement, the implement including a frame, a transverse scraper blade rigid with the frame, transversely spaced wheel units supporting the implement adjacent the blade, means mounting one wheel unit for relative vertical adjustment, a hydraulic ram to control the relative raising and lowering of said unit, and a fluid pressure system connected to the ram; said control mechanism comprising a housing mounted rigid with the frame, a pendulum in the housing, a pivot shaft for the pendulum mounted in the housing and extending lengthwise of the implement, a normally closed valve interposed in the hydraulic system and mounted on the housing, and connections between the pendulum and the valve to open the latter upon relative swinging of the pendulum to one side or the other from the perpendicular; said connections including an arm extending radially from said pivot shaft and rigid with the pendulum, a plate pivoted at one end on the outer end of the arm and extending thence alongside the arm and across the axial plane of the shaft clear of the same to an inner end termination beyond the shaft, a normally fixed pivot for the inner end of the plate, a valve actuated link disposed substantially at right angles to the median plane of the plate and extending thereto, means limiting the longitudinal valve opening movement of the link from a closed position of the valve, the plate being provided with a slot intermediate its ends having opposed sides converging toward each other in the direction of the outer end of said arm to form an apex, a roller on the link projecting into the slot, and a tension spring connected to the link and to the plate and acting to yieldably maintain the roller seated in the slot at said apex and normally engaging both sides of the slot.

8. A lateral level control mechanism for a land leveling implement, the implement including a frame, a transverse scraper blade rigid with the frame, transversely spaced wheel units supporting the implement adjacent the blade, means mounting one wheel unit for relative vertical adjustment, a hydraulic ram to control the relative raising and lowering of said unit, and a fluid pressure system connected to the ram; said control mechanism comprising a housing mounted rigid with the frame, a pendulum in the housing, a pivot shaft for the pendulum mounted in the housing and extending lengthwise of the implement, a normally closed valve interposed in the hydraulic system and mounted on the housing, and connections between the pendulum and the valve to open the latter upon relative swinging of the pendulum to one side or the other from the perpendicular; said connections including an arm extending radially from said pivot shaft and rigid with the pendulum, another shaft axially aligned with but separate from the pivot shaft, an arm projecting radially from said other shaft in a direction opposite the first named arm, a plate disposed between the shafts and extending from adjacent the outer end of the first named arm to adjacent the outer end of the last named arm, pivots parallel to the shafts connecting the outer ends of the arms and the corresponding ends of the plate, a valve actuating push-pull link disposed substantially at right angles to the median plane of the plate and operatively connected thereto intermediate the ends thereof, and manual means to control the rotation of said other shaft and normally maintaining the same against rotation.

References Cited in the file of this patent

UNITED STATES PATENTS

| | | |
|---|---|---|
| 1,201,648 | Tarbox | Oct. 17, 1916 |
| 2,520,266 | Adams | Aug. 29, 1950 |
| 2,647,758 | Ryan | Aug. 4, 1953 |
| 2,734,293 | Barnes | Feb. 14, 1956 |
| 2,792,651 | Hobday | May 21, 1957 |

FOREIGN PATENTS

| | | |
|---|---|---|
| 975,601 | France | Oct. 17, 1950 |